United States Patent
Benkreira et al.

(10) Patent No.: US 11,704,709 B2
(45) Date of Patent: Jul. 18, 2023

(54) SYSTEMS AND METHODS FOR PROACTIVELY INFORMING USERS OF AN AGE OF A MERCHANT DURING ONLINE TRANSACTIONS

(71) Applicant: Capital One Services, LLC, McLean, VA (US)

(72) Inventors: Abdelkader Benkreira, New York, NY (US); Joshua Edwards, Philadelphia, PA (US); Michael Mossoba, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 470 days.

(21) Appl. No.: 16/877,893

(22) Filed: May 19, 2020

(65) Prior Publication Data

US 2021/0366010 A1 Nov. 25, 2021

(51) Int. Cl.
| | |
|---|---|
| G06Q 30/0601 | (2023.01) |
| G06F 16/955 | (2019.01) |
| G08B 21/18 | (2006.01) |
| G06F 40/205 | (2020.01) |
| H04L 9/40 | (2022.01) |

(52) U.S. Cl.
CPC ..... *G06Q 30/0609* (2013.01); *G06F 16/9566* (2019.01); *G06F 40/205* (2020.01); *G08B 21/182* (2013.01); *H04L 63/102* (2013.01)

(58) Field of Classification Search
CPC ............ G06Q 30/0609; G06F 16/9566; G06F 40/205; G08B 21/182; G08B 5/36; H04L 63/102
See application file for complete search history.

(56) References Cited

U.S. PATENT DOCUMENTS

| | | | |
|---|---|---|---|
| 2008/0288588 A1* | 11/2008 | Andam | G06F 16/957 709/204 |
| 2009/0271246 A1 | 10/2009 | Alvarez et al. | |
| 2014/0331322 A1* | 11/2014 | Jaroch | H04L 63/1425 726/23 |
| 2016/0380977 A1* | 12/2016 | Bean | G06F 21/566 726/12 |

FOREIGN PATENT DOCUMENTS

| | | | | |
|---|---|---|---|---|
| WO | WO-2018167570 A2 * | 9/2018 | | G06F 21/31 |

* cited by examiner

*Primary Examiner* — Mohammad W Reza
(74) *Attorney, Agent, or Firm* — Troutman Pepper Hamilton Sanders LLP; Christopher J. Forstner; John A. Morrissett (57) ABSTRACT

The disclosed systems and methods may request a merchant identifier associated with a merchant from a third party, receive the merchant identifier, retrieve or receive a first uniform resource locator (URL) associated with the merchant, and store the merchant identifier and the first URL in a database. In response to a web browser extension detecting that a user is preparing to make an online purchase associated with the merchant, the system may receive an age request for an age of the merchant from a user device and identify the merchant identifier in the database based on a second URL included in the age request. The system may then request the age of the merchant from the database based on the merchant identifier, receive the age of the merchant from the third party, and transmit the age of the merchant to the user device for display.

8 Claims, 5 Drawing Sheets

SYSTEMS AND METHODS FOR PROACTIVELY INFORMING USERS OF AN AGE OF A MERCHANT DURING ONLINE TRANSACTIONS

FIELD OF INVENTION

The present disclosure relates to systems that receives/retrieves an age of a merchant from payment processors or generates an age of a merchant based on transaction data and transmits the age of the merchant to a user device for display so that the user take into account the age of the merchant when deciding to make a purchase from the merchant.

BACKGROUND

When attempting to make a purchase from a merchant, particularly a small, new, or otherwise unfamiliar merchant, a potential purchaser wants to know that they are dealing with a legitimate (and ideally reputable) business. The potential purchaser wants to make sure that their credit card, bank information, and identity are not compromised when making a purchase among other things, and such a compromise presents risk, expense, and inconvenience to both the potential purchase (or credit card holder) and the financial service provider (or credit card provider). For example, from the potential purchaser's perspective, a fraudulent charge using their credit card or other banking information can present a risk as to who is on the hook for fraudulent charge, require actions from the potential purchaser to help monitor for future fraudulent charges, and inconvenience the potential purchaser by requiring replacement of the credit card and updating all recurring charges (e.g., for utilities, donations, etc.) and saved payment profiles to use the new credit card's information. Similarly, from the financial service provider's perspective, a fraudulent charge likely exposes them to liability for the fraud along with the expense of issuing a new credit card and potentially providing credit monitoring services.

Accordingly, there is a need for improved systems and methods to provide a potential buyer an age of a merchant so they can make a more informed decision on whether to trust the merchant with their payment credentials. Embodiments of the present disclosure are directed to this and other considerations.

SUMMARY

Disclosed embodiments provide systems and methods for obtaining/generating an age of a merchant and transmitting that age to a user device for display prior to a user completing a purchase on the user device.

The system may include one or more processors and a memory in communication with the one or more processors and storing instructions that when executed by the one or more processors, are configured to cause the system to perform steps of a method. The system may request a first merchant identifier associated with a merchant (e.g., ABC Company) from a first payment processor database (e.g., a Visa database) and a second merchant identifier associated with the merchant from a second payment processor database (e.g., a Mastercard® database). In response to the request, the system may receive the first merchant identifier (e.g., 12345) associated with the merchant from the first payment processor database and the second merchant identifier (e.g., 23456) associated with the merchant form the second payment processor database. The system may then retrieve or receive a first uniform resource locator (URL) (e.g., store.abc.com) associated with the merchant and store the first merchant identifier, the second merchant identifier, and the first URL in a first database (e.g., a remote third party database) to generate a first data entry for the merchant. In response to a web browser extension via a user device detecting that a user is preparing to make an online purchase, the system may receive an age request for the age of the merchant from the user device (the age request includes a second URL (e.g., store.abc.com)). The system may then identify the first merchant identifier and the second merchant identifier in the first database based on the second URL, request a first age of the merchant from the first payment processor database based on the first merchant identifier and a second age of the merchant from the second payment processor database based on the second merchant identifier, receive the first age of the merchant from the first payment processor database and the second age of the merchant from the second payment processor database, determine that the first age of the merchant is older than the second age of the merchant, and transmit the first age of the merchant to the user device (e.g., a smart phone) for display.

Alternatively, the system may include one or more processors and a memory in communication with the one or more processors and storing instructions that when executed by the one or more processors, are configured to cause the system to perform steps of a method. The system may request a merchant identifier (e.g., 12345) associated with a merchant (e.g., ABC company) from a third party database (e.g., a payment processor database such as a Visa database), receive the merchant identifier associated with the merchant from the third party, retrieve or receive a first uniform resource locator (URL) (e.g., store.abc.com) associated with the merchant, store the merchant identifier and the first URL in a first database to generate a first data entry for the merchant. In response to a web browser extension via a user device detecting that a user is preparing to make an online purchase, the system may receive an age request from the user device for the age of the merchant (the age request including a second URL (e.g., store.abc.com), identify the merchant identifier in the database based on the second URL. The system may then request an age of the merchant from the first database based on the merchant identifier, receive the age of the merchant from the third party, and transmit the age of the merchant to the user device (e.g., a smart phone) for display.

Alternatively, the system may include one or more processors and a memory in communication with the one or more processors and storing instructions that when executed by the one or more processors, are configured to cause the system to perform steps of a method. The method may include retrieving transaction data associated with a merchant (e.g., ABC Co.), determining an age of the merchant by identifying an earliest transaction for the merchant in the transaction data, and storing the age of the merchant and one or more names of the merchant in a database as a first data entry. In response to a web browser extension via a user device detecting that a user is preparing to make an online purchase, the method may include receiving a request from the user device for the age of the merchant (the request includes a first uniform resource locator (URL)). The method also includes matching the first URL to the one or more names of the merchant stored in the database to identify the associated age of the merchant and transmitting the identified age of the merchant to the user device (e.g., a smart phone) for display.

Further features of the disclosed systems, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
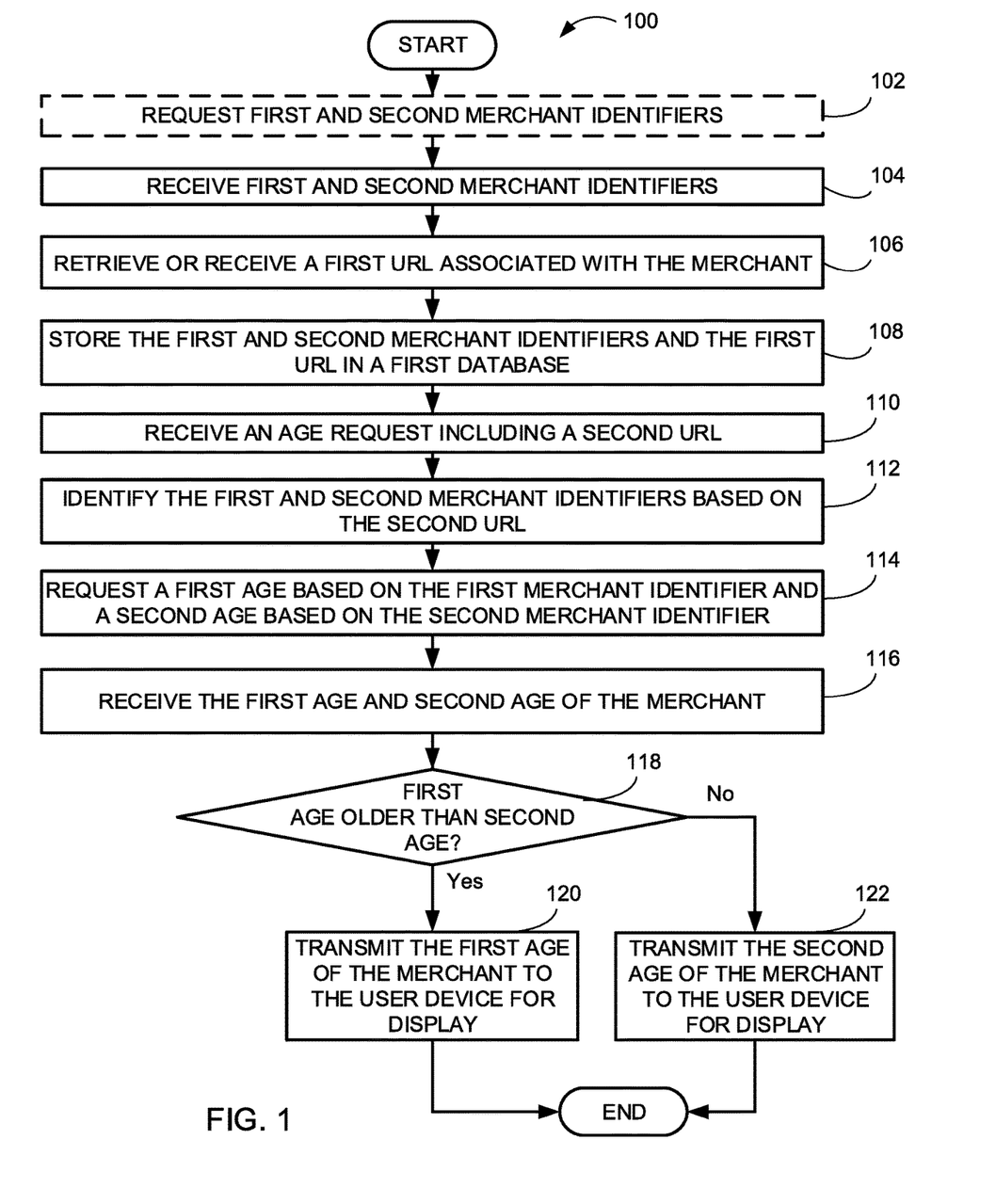
FIG. 1 is a flowchart of an exemplary method for sending the older of two ages of a merchant obtained from payment processors to a user device prior to the user of the user device making a purchase.

FIG. 1 shows a flowchart of a method 100 for providing a user of a user device with a merchant age. Method 100 may be performed by a payment security system (e.g., a merchant age system 420 and/or some or all of the devices and systems within a system 500 described in more detail with respect to FIGS. 4 and 5 below).

In optional block 102, a payment security system may request a first merchant identifier with a merchant from a first payment processor database and a second merchant identifier associated with the merchant from a second payment processor database. For example, the payment security system may send the request through a network or local network to one or more third party servers and/or third party databases, which may correspond to a payment processor database. In some embodiments, whenever a transaction is made with the merchant, one of the first or second payment processor database may automatically transmit merchant identifiers associated with the transaction to the payment security system. For example, the payment security system may store the merchant identifiers associated with the transaction in a database associated with the payment security system (e.g., database 516, described in more detail with respect to FIG. 5) and may send requests to the associated database to retrieve the first and/or second merchant identifiers. Each set of a third party server and/or third party database may correspond to a payment processor (e.g., Visa or Mastercard®), and collectively store merchant identifier that associates a merchant with a number. To obtain the merchant identifier unique to a particular payment processor, the payment security system requests this unique merchant identifier for a particular merchant from each payment processor (e.g., from third party server and/or third party database).

In block 104, the payment security system may receive the first merchant identifier associated with the merchant from the first payment processor database and the second merchant identifier associated with the merchant form the second payment processor database. The third party server and/or third party database for each payment processor transmits its respective merchant identifier to the payment security system. This means that the payment security system receives respective merchant identifiers.

Figure 5:
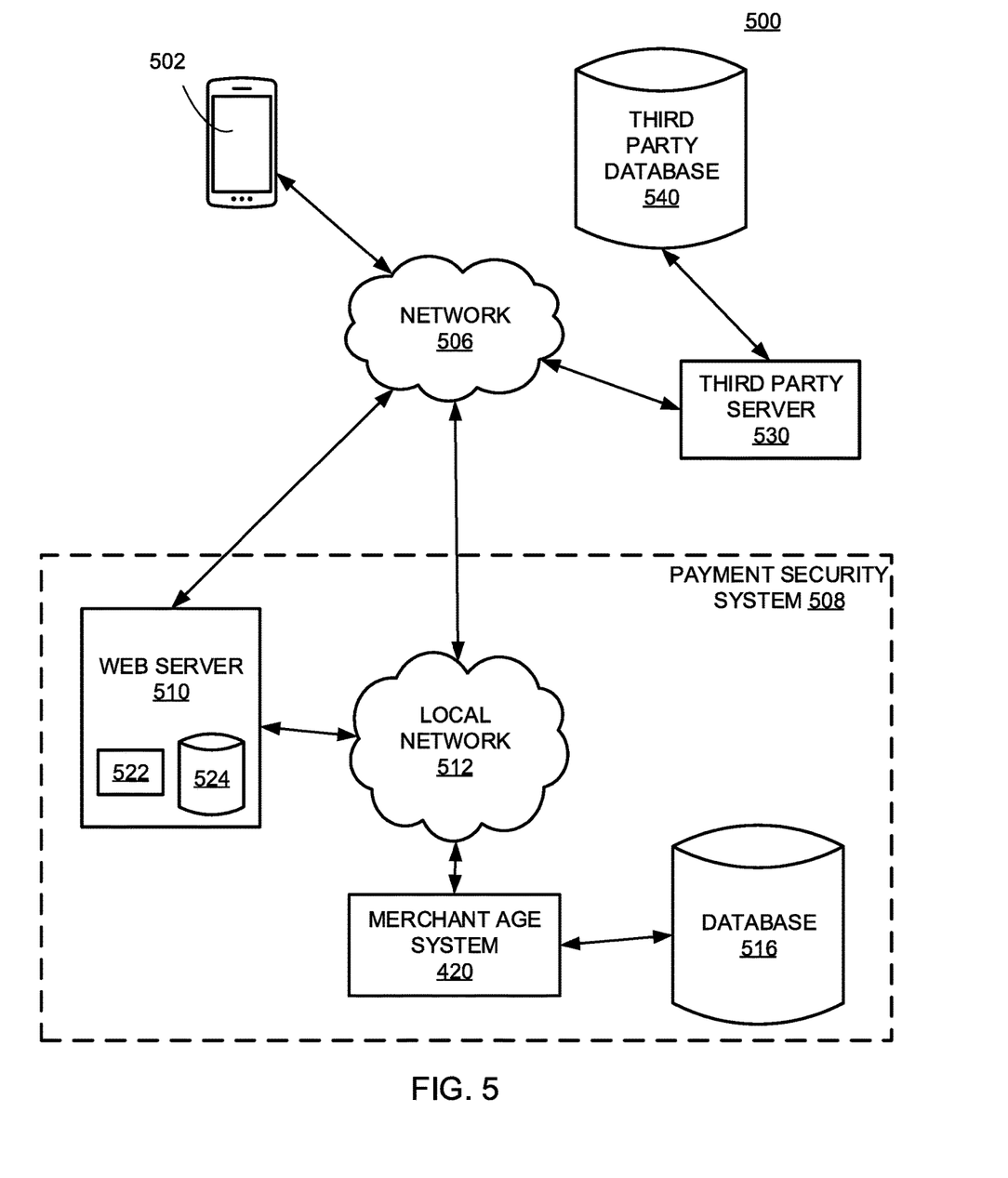
FIG. 5 is a diagram of an exemplary system for obtaining or generating and sending an age of a merchant to a user device.

In block 106, the payment security system may retrieve or receive a first uniform resource locator (URL) (e.g., store-.abc.com) associated with the merchant. The payment security system may receive the URL through a variety of means. For example, the payment security system may receive the URL from one or more third-party data sources (e.g., third party server 530 and/or third party database 540). In some embodiments, the payment security system may receive the URL in response to an API request generated by the payment security system to access the third party data source. In another example, the payment security system may build a database (e.g., database 516) of merchant URLs over time that is sourced passively from one or more users of the payment security system. Transaction data associated with the one or more users of the payment security system may be matched to their browsing behavior to build the database of merchant URLs matched to respective merchant identifiers. In some embodiments, the payment security system may conduct a search (e.g., Google) for a merchant to find the merchant's URL. As another example, the payment security system employs a web crawler to "crawl" a website and retrieve one or more URLs (e.g., store.abc.com, www.abc.com, checkout.abc.com) associated with a particular merchant.

In block 108, the payment security system may store the first merchant identifier, the second merchant identifier, and the first URL in a first database to generate a first data entry for the merchant. In some embodiments, the system may send the first merchant identifier, the second merchant identifier, and the first URL to a remote database for storage.

In block 110, the payment security system may receive an age request for the age of the merchant from the user device in response to a web browser extension via a user device detecting that a user is preparing to make an online purchase. The age request may include a second URL (e.g., store.abc.com). Detecting that a user is preparing to make an online purchase may include detecting a URL shopping indicator in the second URL. Detecting that a user is preparing to make an online purchase may include detecting URL query parameters in the second URL related to shopping or checkout, detecting document object model (DOM) elements related to shopping or checkout, natural language parsing, or a combination thereof.

In block 112, the payment security system may identify the first merchant identifier and the second merchant identifier in the first database based on the second URL. Identifying the first merchant identifier and the second merchant identifier in the first database (e.g., a remote (third party) database) may be based on matching the first URL and the second URL. Identifying the first merchant identifier and the second merchant identifier in the first database may include extracting a root domain (e.g. a hostname) from the second URL, extracting a root domain from the first URL, and attempting to match the root domain of the first URL to the root domain of the second URL. In some embodiments, identifying the first merchant identifier and the second merchant identifier in the first database may include extracting a first name of the merchant from the second URL and conducting a key word search of the name against the first URL or a second name of the merchant stored in the first database.

In block 114, the payment security system may request a first age of the merchant from the first payment processor database based on the first merchant identifier and a second age of the merchant from the second payment processor database based on the second merchant identifier. The first age may be determined by determining the earliest transaction associated with the first merchant identifier. Similarly, the second age may be determined by determining the earliest transaction associated with the second merchant identifier. In some embodiments, the payment security system requests respective transaction data from the respective payment processors particular to the merchant based on the respective merchant identifiers.

In block 116, the payment security system may receive the first age of the merchant from the first payment processor database and the second age of the merchant from the second payment processor database. In some embodiments, the payment security system receives respective transaction data from the respective payment processors particular to the merchant based on the respective merchant identifiers in response to the respective requests.

In block 118, the payment security system may determine whether the first age of the merchant is older than the second age of the merchant. In response to receiving the respective transaction data from each respective payment processor, the payment security system may generate/calculate age of the merchant for each set of transaction data. The calculated age may be based on transaction timestamps for each of the transactions. Alternatively, the payment security system may determine/generate the age of the merchant by identifying the oldest transaction from the combined transaction data based on the associated transaction timestamps, where the system may calculate that the oldest transaction date to the current date is the age of the merchant using the relevant transaction timestamp.

In block 120, the payment security system may transmit the first age of the merchant to the user device for display in response to the payment security system determining that the first age of the merchant is older than the second age of the merchant. In some embodiments, the payment security system may cause the user device to display the date of creation of the second URL. In some embodiments, the payment security system may generate an age estimate based on the determined first age. For example, when the payment security system determines that the oldest transaction is, e.g., 632 days, the system may cause the user device to display an indication that the first age of the merchant is "a year and a half" or "nearly two years" in order to make the system more user-friendly.

In block 122, the payment security system may transmit the second age of the merchant to the user device for display in response to the payment security system determining that the second age of the merchant is older than the first age of the merchant.

In some embodiments, the payment security system receives a date of creation (e.g., Dec. 12, 2009) associated with the second URL (e.g., store.abc.com). The payment security system may obtain the date of creation via a web crawler. In some embodiments, the payment security system may obtain the date of creation through publicly available domain registration records that may be stored on one or more third-party servers. The payment security system may determine that the second URL (e.g., store.abc.com) does not match the first URL (e.g., www.abc.com). The payment security system may transmit the second URL and the date of creation of the second URL to the first database to generate a second data entry (as oppose to editing the first data entry described above) for the merchant in response to determining that the second URL does not match the first URL.

In some embodiments, the payment security system receives a threshold age. The threshold age may be received from a user device, with the user setting the threshold age via user input corresponding with the user's preferences. For example, the user may set a threshold age to be 6 months. Regardless, the payment security system may determine whether the first age of the merchant is older than the threshold age after determining that the first age of the merchant is older than the second age of the merchant. When the first age (e.g., 7 years) of the merchant is older than the threshold age (e.g., 6 months), the payment security system may cause the user device to display the first age (e.g., 7 years) of the merchant. On the other hand, when the first age (e.g., 2 months) of the merchant is less than the threshold age (e.g., 6 months), the payment security system may cause the user device to display a warning indicator that at least partially blocks the user's view of a website associated with the second URL until user-input to close the warning indicator is received.

Figure 2:
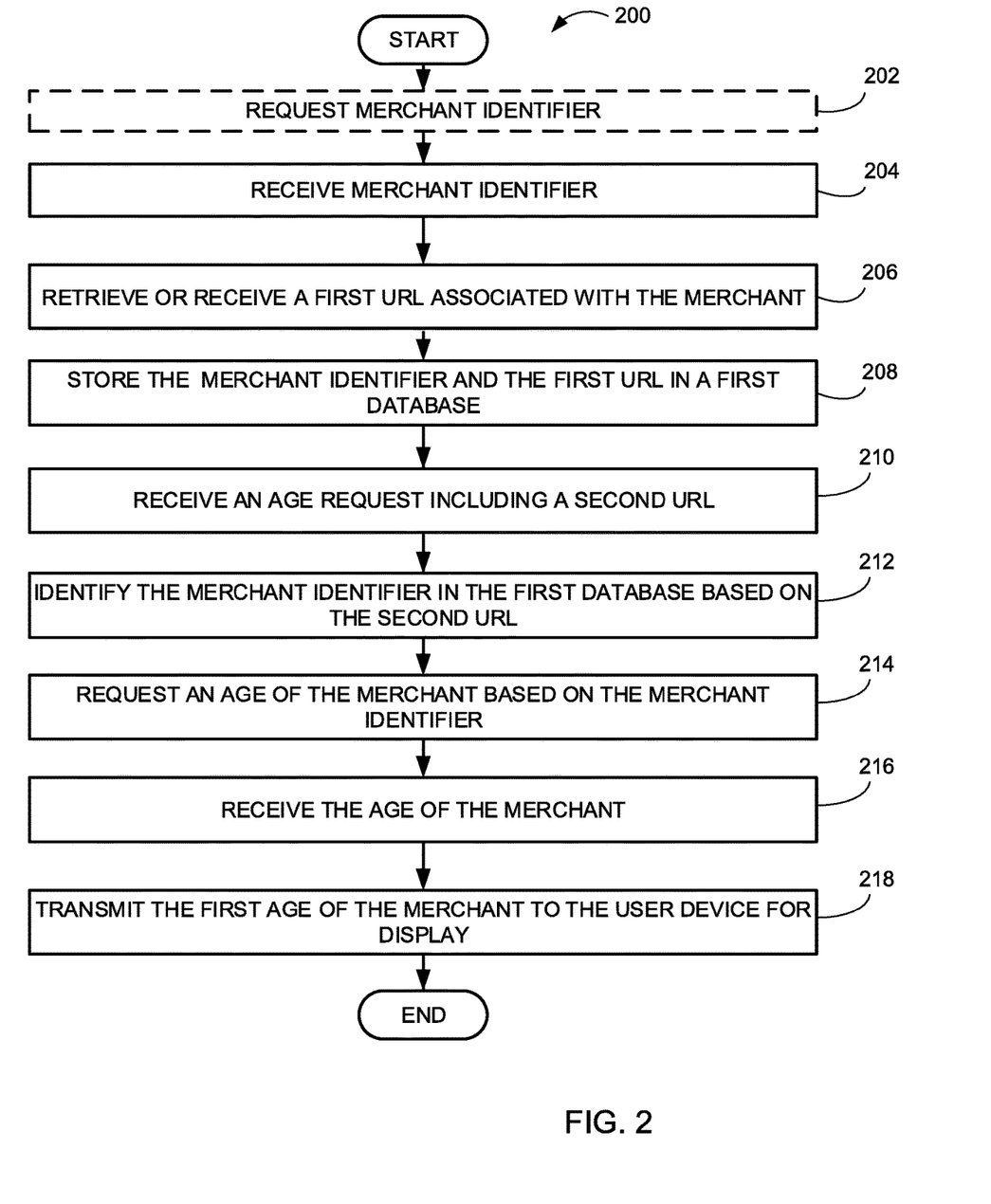
FIG. 2 is a flowchart of another exemplary method for sending an age of a merchant obtained from payment processors to a user device prior to the user of the user device making a purchase.

FIG. 2 shows a flowchart of a method 200 for providing a user of a user device with a merchant age. Method 200 may be performed by a payment security system (e.g., the merchant age system 420 and/or some or all of the devices and systems within the system 500 described with respect to FIGS. 4 and 5 below). Method 200 is similar to method 100 except that method 200 does not include steps or blocks similar to blocks 118 and 122. However, blocks 202, 204, 206, 208, 210, 212, 214, 216, and 218 are substantially similar to blocks 102, 104, 106, 108, 110, 112, 114, 116, and 120 respectively, and incorporate by reference the descriptions referring to blocks 102, 104, 106, 108, 110, 112, 114, 116, and 120 above. Thus, for ease of reference and conciseness, the descriptions of blocks 102, 104, 106, 108, 110, 112, 114, 116, and 120 will not be repeated for blocks 202, 204, 206, 208, 210, 212, 214, 216, and 218.

Figure 3:
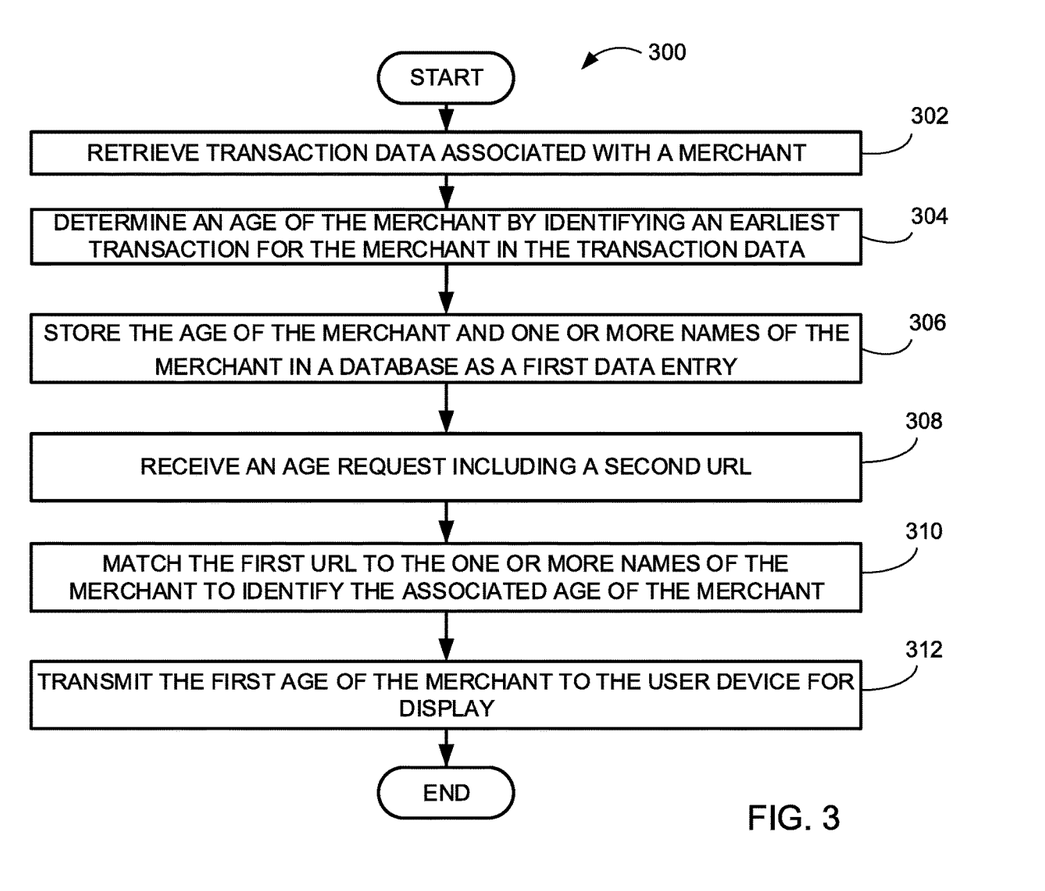
FIG. 3 is a flowchart of a further exemplary method for sending an age of a merchant determined or generated by the system to a user device prior to the user of the user device making a purchase.

FIG. 3 shows a flowchart of a method 200 for providing a user of a user device with a merchant age. Method 300 may be performed by a payment security system (e.g., a merchant age system 420 and/or some or all of the devices and systems within a system 500 described with respect to FIGS. 4 and 5 below). Method 300 recites blocks 308 and 312, which are substantially similar to blocks is similar to respective blocks 110 and 120 in method 100. The description of blocks 110 and 120 are incorporated by reference for blocks 308 and 312. Thus, for ease of reference and conciseness, the descriptions of blocks 110 and 120 will not be repeated for blocks 308 and 312.

In block 302, the payment security system may retrieve transaction data associated with a merchant. This transaction data may reside in a database associated with a credit card company or other financial service provider and be compiled from each transaction for a certain number of years (e.g., 7 years). Thus, the payment security system may simply access that transaction data.

In block 304, the payment security system may determine an age of the merchant by identifying an earliest transaction for the merchant in the transaction data. The payment security system may search the database for the earliest transaction for a particular merchant and based on that transaction the payment security system may determine the age of the merchant up to the record limit (e.g., 7 years). Thus, the age of the merchant may be 7 plus (e.g., 7+) years if the oldest transaction is seven years old and the record limit is seven years.

In block 306, the payment security system may store the age of the merchant and one or more names of the merchant in a database as a first data entry. In some embodiments, the payment security system may send the age of the merchant and on or more names of the merchant to a remote database for storage. Because a merchant may change names, it is important to store more than one name of a merchant if they have more than one.

In block 308, the description of block 110 above is incorporated herein.

In block 310, the payment security system may match the first URL to the one or more names of the merchant stored in the database to identify the associated age of the merchant. For example, the first URL (e.g., www.abc.com) may include the name of the company or a portion (ABC when the companies name is ABC Company) thereof. Thus, a search can be conducted comparing the URL to the name of the company to obtain the associated age of the merchant. Alternatively, the database storing the age of the company may also store known URLs for an associated merchant. Thus, the payment security system may simply match the first URL with URLs found in the database to find the associated age of the merchant.

In block 312, the description of block 120 above is incorporated herein.

Figure 4:
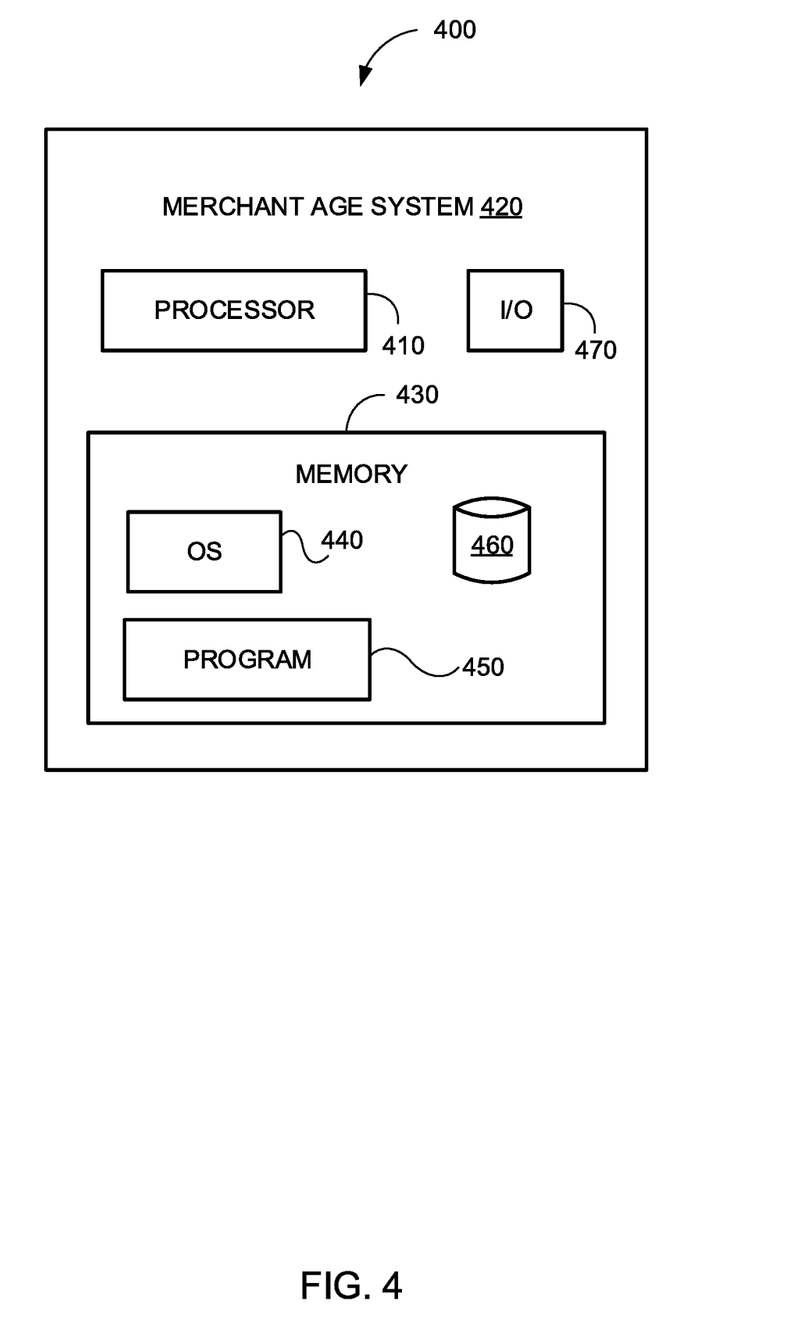
FIG. 4 is a component diagram of an exemplary merchant age system.

FIG. 4 is a component diagram of an example of the merchant age system 420 that may be used to generate a merchant trust score and generate and send a payment recommendation (e.g., a temporary credit card number) to a user device for use.

As shown, merchant age system 420 may include a processor 410, an input/output ("I/O") device 470, a memory 430 containing an operating system ("OS") 440 and a program 450. For example, merchant age system 420 may be a single device or server or may be configured as a distributed computer system including multiple servers, devices, or computers that interoperate to perform one or more of the processes and functionalities associated with the disclosed embodiments. In some embodiments, merchant age system 420 may further include a peripheral interface, a transceiver, a mobile network interface in communication with the processor 410, a bus configured to facilitate communication between the various components of merchant age system 420, and a power source configured to power one or more components of merchant age system 420.

A peripheral interface (not shown) may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver (not shown) may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface (not shown) may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to components requiring power.

Processor 410 may include one or more of a microprocessor, microcontroller, digital signal processor, co-processor or the like or combinations thereof capable of executing stored instructions and operating upon stored data. Memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 430.

Processor 410 may be one or more known processing devices, such as a microprocessor from the Pentium™ family manufactured by Intel™ or the Turion™ family manufactured by AMD™. Processor 410 may constitute a single core or multiple core processor that executes parallel processes simultaneously. For example, processor 410 may be a single core processor that is configured with virtual processing technologies. In certain embodiments, processor 410 may use logical processors to simultaneously execute and control multiple processes. Processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Merchant age system 420 may include one or more storage devices configured to store information used by processor 410 (or other components) to perform certain functions related to the disclosed embodiments. In some embodiments, merchant age system 420 may include memory 430 that includes instructions to enable processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, merchant age system 420 may include memory 430 that includes instructions that, when executed by processor 410, perform one or more processes consistent with the functionalities disclosed herein. Methods, systems, and articles of manufacture consistent with disclosed embodiments are not limited to separate programs or computers configured to perform dedicated tasks. For example, merchant age system 420 may include memory 430 that may include one or more programs 450 to perform one or more functions of the disclosed embodiments. Moreover, processor 410 may execute one or more programs 450 located remotely from payment security system 508 (see FIG. 5). For example, payment security system 508 may access one or more remote programs 450, that, when executed, perform functions related to disclosed embodiments. In some embodiments, merchant age system 420 may include a metadata and password risk scoring program 450 that is a rules-based program for assigning or generating a metadata risk score that may represent how closely metadata (e.g., user device location information, MAC ID of the user device, and an attempted login time) associated with an attempted login corresponds to metadata associated with previous attempted logins and assigning or generating a password risk score that may represent how closely an attempted password corresponds to previous attempted passwords and a correct password.

Memory 430 may include one or more memory devices that store data and instructions used to perform one or more features of the disclosed embodiments. Memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 430 may include software components that, when executed by processor 410, perform one or more processes consistent with the disclosed embodiments. In some embodiments, memory 430 may include a database 460 for storing related data to enable merchant age system 420 to perform one or more of the processes and functionalities associated with the disclosed embodiments.

Merchant age system 420 may also be communicatively connected to one or more memory devices (e.g., databases) locally or through a network. The remote memory devices may be configured to store information and may be accessed and/or managed by merchant age system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Merchant age system 420 may also include one or more I/O devices 470 that may comprise one or more interfaces for receiving signals or input from devices and providing signals or output to one or more devices that allow data to be received and/or transmitted by merchant age system 420. For example, merchant age system 420 may include interface components, which may provide interfaces to one or more input devices, such as one or more keyboards, mouse devices, touch screens, track pads, trackballs, scroll wheels, digital cameras, microphones, sensors, and the like, that enable merchant age system 420 to receive data from one or more users.

In exemplary embodiments of the disclosed technology, merchant age system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

FIG. 5 is an example block diagram of the system 500 that may be used to generate a merchant trust score and generate and send a payment recommendation (e.g., a temporary credit card number) to a user device for use. The components and arrangements shown in FIG. 5 are not intended to limit the disclosed embodiments as the components used to implement the disclosed processes and features may vary. As system 500 may include a user device 502, a third party server 530, a third party database 540, and a payment security system 508 configured to communicate over a network 506. The payment security system 508, or one or more components therein, may be configured to interact with the user device 502 (e.g., send an age of a merchant). As shown, the payment security system 508 may include, for example, a web server 510, a local network 512, a merchant age system 420, and a database 516. Web server 510, user device 502, and/or third party server 530 may have a similar structure as shown and described with respect to FIG. 4 and may include many components that are similar to or even have the same capabilities as those described with respect to merchant age system 420.

In some embodiments, a customer may operate a user device 502. Although user device 502 is shown to be a smart phone, user device 502 can each include one or more of a mobile device, smart phone, general purpose computer, tablet computer, laptop computer, telephone, PSTN landline, smart wearable device, other mobile computing device, or any other device capable of communicating with other devices (e.g., including those of payment security system 508) via the local network 512, network 506, or both. In some embodiments, user device 102 may include or incorporate electronic communication devices for hearing or vision impaired users. User device 102 may belong to or be provided by a user, or may be borrowed, rented, or shared. According to some embodiments, user devices 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

In some embodiments, the payment security system 508 may interact with (e.g., request/receive data from) a third party database 540 via a third party server 530 or without a third party server 530. In some embodiments, the third party server 530 and database may include a server and/or database from a payment processor (e.g., Visa, Mastercard®, American Express). The third party database 540 may store, among other things, transaction data (e.g., amount of a transaction), merchant identifiers, and a merchant name (e.g., Walmart) for each merchant associated with transactions using a particular payment processor (e.g., Visa). As explained previously, the payment security system 508 (e.g., merchant age system 420) may call the third party database 540 to retrieve the merchant identifier associated with a merchant's name. Sometimes, the third party server 530 is involved to handle the request for the merchant identifier from the third party database 540 and transmit the requested information (e.g., merchant identifier) to the payment security system 508 (e.g., merchant age system 420).

Local network 512 may comprise any type of computer networking arrangement used to exchange data in a localized area, such as WiFi, Bluetooth™, Ethernet, and other suitable network connections that enable user device 102 to interact with one another and to connect to network 506 for interacting with components in system environment 500. In some embodiments, local network 512 may comprise an interface for communicating with or linking to network 506. In some embodiments, local network 512 may include a home network, such as a LAN or WLAN set up in a user's house. In some embodiments, local network 512 may be commonly used network of a local business, such as, for example, a Wi-Fi network at a particular coffee shop.

Network 506 may be of any suitable type, including individual connections via the internet such as cellular or WiFi networks. In some embodiments, network 506 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 506 may comprise any type of computer networking arrangement used to exchange data. For example, network 506 may be the Internet, a private data network, virtual private network using a public network, and/or other suitable connection(s) that enables components in system environment 500 to send and receive information between the components of system 500. Network 506 may also include a public switched telephone network ("PSTN") and/or a wireless network.

Payment security system 508 may be associated with an entity such as a business, corporation, individual, partnership, or any other group that provides one or more of goods, services, and consultations to individuals who are or potentially are consumers of those goods, services, and consultations.

Payment security system 508 may include one or more servers, devices, and computer systems for performing one or more functions associated with products and/or services that the entity associated with the payment security system 508 provides. Such servers, devices, and computer systems may include, for example, web server 510 and merchant age system 420, as well as any other computer systems necessary to accomplish tasks associated with payment security system 508.

Web server 510 may include a computer system configured to generate and provide one or more websites accessible to customers, as well as any other individuals involved in payment security system 508's normal operations. Web server 510 may include a computer system configured to receive communications from user device 502 via for example, a mobile application, a chat program, an instant messaging program, a voice-to-text program, an SMS message, email, or any other type or format of written or electronic communication. Web server 510 may have one or more processors 522 and one or more web server databases 524, which may be any suitable repository of website data. Information stored in web server 510 may be accessed (e.g., retrieved, updated, and added to) via local network 512 and/or network 506 by one or more devices or systems (e.g., merchant age system 510) of system 500. In some embodiments, web server 510 may host websites or applications that may be accessed by the user device 102. For example, web server 510 may host a financial service provider website that a user device may access by providing an attempted login that are authenticated by the merchant age system 420. According to some embodiments, web server 510 may include software tools, similar to those described with respect to user device 502 above, that may allow web server 510 to obtain network identification data from user device 502.

Local networks 512 may comprise any type of computer networking arrangement used to exchange data in a localized area, such as WiFi, Bluetooth™, Ethernet, and other suitable network connections that enable components of payment security system 508 to interact with one another and to connect to network 506 for interacting with components in system environment 500. In some embodiments, local network 512 may comprise an interface for communicating with or linking to network 506. In other embodiments, components of payment security system 508 may communicate via network 506, without a separate local network 512.

Database 516 may be a database associated with payment security system 508 and may store a variety of information relating to users, transactions, user credentials (e.g., usernames and passwords), customer networks and devices, and business operations. Database 516 may also serve as a back-up storage device and may contain data and information that is also stored on, for example, local databases associated with web server 510, merchant age system 420. Database 516 may be accessed by other devices or systems (e.g., merchant age system 420) and may be used to store records of every interaction, communication, and/or transaction a particular user has had with payment security system 508.

While web server 510, merchant age system 420, and third party server 530 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 510, merchant age system 420, and third party server 530 may include a greater or lesser number of components than those illustrated.

Although the preceding description describes various functions of user device 102, web server 510, database 516, and merchant age system 420, in some embodiments, some or all of these functions may be carried out by a single computing device.

Exemplary Use Cases

The following exemplary use cases describe examples of a typical user flow pattern. They are intended solely for explanatory purposes and not in limitation. A user may want to know how long a company (e.g., a small company) has been in business prior to deciding to purchase a product or service from that company. The longer a company has been in business (or at least having an age above a certain threshold, e.g., 6 months in business), the higher likelihood that that company is trustworthy. To aid the user in finding out the age of a merchant, the user may install a web browser plugin on his user device (e.g., user device 502).

This web browser plugin may detect when a user is preparing to make an online purchase in a number of ways. First, the web browser plugin may detect a shopping URL indicator in the current URL. For example, the URL may change from a URL with no shopping indication (e.g., www.abc.com) to a URL with a shopping indication (e.g., store.abc.com), where the shopping indication is the use of a words such as store, checkout, cart, shopping, etc. As other examples, the web browser plugin may detect URL query parameters in the current URL related to shopping or checkout, detecting document object model (DOM) elements related to shopping or checkout, conduct natural language parsing, or a combination thereof. Regardless, the web browser plugin detects that the user is preparing to make an online purchase, and in response to the detection, the web browser plugin (via the user device 102) transmits an age request of the merchant to the payment security system 508 (e.g., merchant age system 420). Put another way, the payment security system 508 (e.g., merchant age system 420) receives an age request for the age of the merchant from the user device 102, wherein the age request includes a (e.g., current) URL of that the user device 102 has plugged in into the user device's 102 web browser that corresponds the detection.

After receiving the age request, the payment security system 508 (e.g., merchant age system 420) identifies a stored first merchant identifier and a stored second merchant identifier based on the (e.g., current) URL of the user device by comparing the URL to a stored URL associated with the merchant. The payment security system 508 (e.g., merchant age system 420) then requests a first age of the merchant from a first payment processor database (e.g., a Visa database) using the first merchant identifier and requests a second age of the merchant from a second payment processor database (e.g., a Mastercard® database). The payment security system 508 (e.g., merchant age system 420) then receives the first age and the second age of the merchant respectively from the first and second payment processor databases. The payment security system 508 (e.g., merchant age system 420) then determines whether the first age or the second age is the oldest and transmits the oldest age (e.g., first age) to the user device 102 (e.g., web browser plugin) for display.

In the above described example, the payment security system 508 (e.g., merchant age system 420) has already requested and received merchant identifiers from respective payment processor databases (e.g., Visa database and Mastercard® database). In addition, the payment security system 508 (e.g., merchant age system 420) has already received or retrieved a uniform resource locator (URL) associated with the merchant. The payment security system 508 (e.g., merchant age system 420) has also already stored the merchant identifiers and a URL associated with the merchant in a database (e.g., database 516) so that this information can be referenced based on a URL lookup.

In the above described example, more than one merchant identifier was obtained from more than on payment processor databases. In some embodiments, only one merchant identifier is obtained from a third-party database. Thus, there is no need to compare more than one age to determine what age is the oldest.

In another example, the user may similarly install a web browser plugin used to detect when a user is preparing to make an online purchase. However, prior to the user visiting the website of a merchant, the payment security system 508 (e.g., merchant age system 420) may have previously determined an age of that merchant by identifying an earliest transaction for the merchant in retrieved transaction data associated with the merchant. The payment security system 508 (e.g., merchant age system 420) may store this age of the merchant (which may be updated bi-annually, monthly, annually) in a database (e.g., database 516). Thus, when the user prepares to make an online purchase (e.g., is as the checkout screen), the web browser plugin detects the status of the user and sends a request from the web browser plugin (via user device 102) for the age of the merchant with the request including a URL, which the payment security system 508 (e.g., merchant age system 420) receives. The payment security system 508 (e.g., merchant age system 420) then matches the URL to the one or more names of the merchant stored in the database to identify the associated age of the merchant. The payment security system 508 (e.g., merchant age system 420) then transmits the identified age of the merchant to the user device via the web browser plugin for display.

To perform these various exemplary uses cases, in some examples, the system may include one or more processors and a memory in communication with the one or more processors and storing instructions that when executed by the one or more processors, are configured to cause the system to perform steps of a method. The method may include requesting a first merchant identifier associated with a merchant from a first payment processor database and a second merchant identifier associated with the merchant from a second payment processor database, receiving the first merchant identifier associated with the merchant from the first payment processor database and the second merchant identifier associated with the merchant form the second payment processor database, retrieving or receiving a first uniform resource locator (URL) associated with the merchant, storing the first merchant identifier, the second merchant identifier, and the first URL in a first database to generate a first data entry for the merchant, in response to a web browser extension via a user device detecting that a user is preparing to make an online purchase, receive an age request for the merchant from the user device, wherein the age request may include a second URL, identifying the first merchant identifier and the second merchant identifier in the first database based on the second URL, requesting a first age of the merchant from the first payment processor database based on the first merchant identifier and a second age of the merchant from the second payment processor database based on the second merchant identifier, receiving the first age of the merchant from the first payment processor database and the second age of the merchant from the second payment processor database, determine that the first age of the merchant is older than the second age of the merchant, and transmitting the first age of the merchant to the user device for display.

In the method, identifying the first merchant identifier and the second merchant identifier in the first database may be based on matching the first URL and the second URL. Additionally, the first database may be a remote third party database.

The method may further include receiving a date of creation associated with the second URL, determining that the second URL does not match the first URL, and in response to determining that the second URL does not match the first URL, transmitting the second URL and the date of creation of the second URL to the first database to generate a second data entry for the merchant.

The method may further include causing the user device to display the date of creation of the second URL.

In the method, identifying the first merchant identifier and the second merchant identifier in the first database may include extracting a first name of the merchant from the second URL and conducting a key word search of the name against the first URL or a second name of the merchant stored in the first database.

In the method, detecting that a user is preparing to make an online purchase comprises detecting a URL shopping indicator in the second URL.

In the method, detecting that a user is preparing to make an online purchase comprises detecting URL query parameters in the second URL related to shopping or checkout, detecting document object model (DOM) elements related to shopping or checkout, conduct natural language parsing, or a combination thereof.

The method may further include receiving a threshold age and determining whether the first age of the merchant is older than the threshold age. When the first age of the merchant is older than the threshold age, causing the user device to display the first age of the merchant. When the first age of the merchant is less than the threshold age, causing the user device to display a warning indicator that at least partially blocks the user's view of a website associated with the second URL until user-input to close the warning indicator is received.

Alternatively, the system may include one or more processors and a memory in communication with the one or more processors and storing instructions that when executed by the one or more processors, are configured to cause the system to perform steps of a method. The method may include requesting a merchant identifier associated with a merchant from a third party database, receiving the merchant identifier associated with the merchant from the third party, retrieving or receiving a first uniform resource locator (URL) associated with the merchant, storing the merchant identifier and the first URL in a first database to generate a first data entry for the merchant. In response to a web browser extension via a user device detecting that a user is preparing to make an online purchase, the method may further includes receiving an age request from the user device for an age of the merchant. The age request comprises a second URL. The method further includes identifying the merchant identifier in the database based on the second URL, requesting the age of the merchant from the first database based on the merchant identifier, receiving the age of the merchant from the third party, and transmit the age of the merchant to the user device for display.

In the method, identifying the first merchant identifier and the second merchant identifier in the first database may be based on matching or partially matching the first URL and the second URL. Additionally, the first database may be a remote third party database.

The method may further include receiving a date of creation associated with the second URL, determining that the second URL does not match the first URL, and in response to determining that the second URL does not match the first URL, transmitting the second URL and the date of creation of the second URL to the first database to generate a second data entry for the merchant.

The method may further include causing the user device to display the date of creation of the second URL.

In the method, identifying the first merchant identifier and the second merchant identifier in the first database may include extracting a first name of the merchant from the second URL and conducting a key word search of the name against the first URL or a second name of the merchant stored in the first database.

In the method, detecting that a user is preparing to make an online purchase may include detecting a URL shopping indicator in the second URL.

In the method, detecting that a user is preparing to make an online purchase may include detecting URL query parameters in the second URL related to shopping or checkout, detecting document object model (DOM) elements related to shopping or checkout, conduct natural language parsing, or a combination thereof.

The method may further include receiving a threshold age, determining whether the first age of the merchant is older than the threshold age. When the first age of the merchant is older than the threshold age, the method may include causing the user device to display the first age of the merchant. When the first age of the merchant is less than the threshold age, the method may include causing the user device to display a confirmation message that at least partially blocks the user's view of a website and must be selected as an acknowledgement to exit.

Alternatively, the system may include one or more processors and a memory in communication with the one or more processors and storing instructions that when executed by the one or more processors, are configured to cause the system to perform steps of a method. The method may include retrieving transaction data associated with a merchant, determining an age of the merchant by identifying an earliest transaction for the merchant in the transaction data, storing the age of the merchant and one or more names of the merchant in a database as a first data entry. In response to a web browser extension via a user device detecting that a user is preparing to make an online purchase, the method may include receiving a request from the user device for the age of the merchant. The request may include a first uniform resource locator (URL). The method may further include, matching the first URL to the one or more names of the merchant stored in the database to identify the associated age of the merchant and transmitting the identified age of the merchant to the user device for display.

In the method, detecting that a user is preparing to make an online purchase may include detecting a URL shopping indicator in the first URL In the method, detecting that a user is preparing to make an online purchase may include detecting URL query parameters in the first URL related to shopping or checkout, detecting document object model (DOM) elements related to shopping or checkout, natural language parsing, or a combination thereof.

The method may further include retrieving or receiving a second URL associated with the merchant, retrieving or receiving a date of creation associated with the first URL, and determining that the second URL does not match the first URL. The method may also include (i) transmitting the first URL and the date of creation of the first URL to the database to generate a second data entry for the merchant and (ii) causing the user device to display the date of creation of the first URL in response to determining that the second URL does not match the first URL.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   one or more processors; and
   memory in communication with the one or more processors and storing instructions that, when executed by the one or more processors, are configured to cause the system to:
   request a first merchant identifier associated with a merchant from a first payment processor database and a second merchant identifier associated with the merchant from a second payment processor database;
   receive the first merchant identifier associated with the merchant from the first payment processor database and the second merchant identifier associated with the merchant form the second payment processor database;
   retrieve or receive a first uniform resource locator (URL) associated with the merchant;
   store the first merchant identifier, the second merchant identifier, and the first URL in a first database to generate a first data entry for the merchant;
   in response to a web browser extension via a user device detecting that a user is preparing to make an online purchase, receive an age request for the merchant from the user device, wherein the age request comprises a second URL;
   identify the first merchant identifier and the second merchant identifier in the first database based on the second URL;
   request a first age of the merchant from the first payment processor database based on the first merchant identifier and a second age of the merchant from the second payment processor database based on the second merchant identifier;
   receive the first age of the merchant from the first payment processor database and the second age of the merchant from the second payment processor database;
   determine that the first age of the merchant is older than the second age of the merchant based on transaction timestamps associated with the first and second merchant identifiers; and
   transmit the first age of the merchant to the user device for display.

2. The system of claim 1, wherein identifying the first merchant identifier and the second merchant identifier in the first database is based on matching the first URL and the second URL and wherein the first database is a remote third party database.

3. The system of claim 2, further comprising instructions that, when executed by the one or more processors, are configured to cause the system to:
   receive a date of creation associated with the second URL;
   determine that the second URL does not match the first URL; and
   in response to determining that the second URL does not match the first URL, transmit the second URL and the date of creation of the second URL to the first database to generate a second data entry for the merchant.

4. The system of claim 3, further comprising instructions that, when executed by the one or more processors, are configured to cause the system to:

cause the user device to display the date of creation of the second URL.

5. The system of claim 1, wherein identifying the first merchant identifier and the second merchant identifier in the first database comprises extracting a first name of the merchant from the second URL and conducting a key word search of the name against the first URL or a second name of the merchant stored in the first database.

6. The system of claim 1, wherein detecting that a user is preparing to make an online purchase comprises detecting a URL shopping indicator in the second URL.

7. The system of claim 1, wherein detecting that a user is preparing to make an online purchase comprises detecting URL query parameters in the second URL related to shopping or checkout, detecting document object model (DOM) elements related to shopping or checkout, conduct natural language parsing, or a combination thereof.

8. The system of claim 1, further comprising instructions that, when executed by the one or more processors, are configured to cause the system to:
    receive a threshold age;
    determine whether the first age of the merchant is older than the threshold age;
    when the first age of the merchant is older than the threshold age, cause the user device to display the first age of the merchant; and
    when the first age of the merchant is less than the threshold age, cause the user device to display a warning indicator that at least partially blocks the user's view of a website associated with the second URL until user-input to close the warning indicator is received.

* * * * *